United States Patent
Sutherland et al.

(10) Patent No.: US 6,574,718 B2
(45) Date of Patent: Jun. 3, 2003

(54) EXCESSIVE SPIN DETECTION AND AVOIDANCE FOR SYSTEMS USING A LEAST RECENTLY USED PAGE REPLACEMENT ALGORITHM

(75) Inventors: Danny R. Sutherland, Poughkeepsie, NY (US); Elpida Tzortzatos, Lagrangeville, NY (US); Peter B. Yocum, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 09/795,728

(22) Filed: Feb. 28, 2001

(65) Prior Publication Data

US 2002/0120821 A1 Aug. 29, 2002

(51) Int. Cl.$^7$ ............................................. G06F 12/00
(52) U.S. Cl. ..................... 711/159; 711/160; 709/102; 709/1
(58) Field of Search ............................... 711/159, 160, 711/167, 203; 709/1, 100, 102, 103, 104, 107, 108

(56) References Cited

U.S. PATENT DOCUMENTS

| | | | | |
|---|---|---|---|---|
| 4,422,145 A | | 12/1983 | Sacco et al. ................ 711/160 |
| 4,989,133 A | * | 1/1991 | May et al. .................. 709/102 |
| 5,193,172 A | * | 3/1993 | Arai et al. .................. 709/104 |
| 5,293,599 A | * | 3/1994 | Kagimasa et al. ........... 711/159 |
| 5,392,415 A | * | 2/1995 | Badovinatz et al. ......... 709/100 |
| 5,394,531 A | * | 2/1995 | Smith ......................... 711/136 |
| 5,394,539 A | * | 2/1995 | Neuhard et al. ............. 711/209 |
| 5,590,308 A | | 12/1996 | Shih ............................ 711/136 |
| 5,737,565 A | | 4/1998 | Mayfield ..................... 711/213 |
| 5,797,020 A | | 8/1998 | Bonella et al. .............. 711/240 |
| 5,809,528 A | | 9/1998 | Miller et al. ................. 711/136 |
| 5,991,845 A | * | 11/1999 | Bohannon et al. ........... 710/200 |
| 6,012,126 A | | 1/2000 | Aggarwal et al. ........... 711/133 |
| 6,473,842 B1 | * | 10/2002 | Tsutsumi ..................... 711/159 |

\* cited by examiner

*Primary Examiner*—Do Hyun Yoo
*Assistant Examiner*—Kathy Takeguchi
(74) *Attorney, Agent, or Firm*—Scully, Scott, Murphy & Presser; William A. Kinnaman, Jr.

(57) ABSTRACT

A system and method for eliminating excessive spin conditions on systems implementing a LRU algorithm. This is achieved by limiting the amount of time a LRU task is allowed to run in any one invocation. If this time limit is exceeded before the LRU task has completed its processing, the LRU task will reschedule itself to run after a short time interval, record which frames have been processed so far, release its serialization resources, and exit to open a window of enablement. During this window, other processes that were spinning for the serialization resources can have a chance to run. When the LRU task runs again it will re-obtain the serialization resources and continue processing frames that were not previously processed. The above process will be repeated until all the appropriate frames in the system are in LRU order.

12 Claims, 3 Drawing Sheets

EXCESSIVE SPIN DETECTION AND AVOIDANCE FOR SYSTEMS USING A LEAST RECENTLY USED PAGE REPLACEMENT ALGORITHM

BACKGROUND OF THE INVENTION

1. Field of the Invention

This invention relates generally to virtual memory storage systems for mini and mainframe computing systems, and particularly, to a novel system for enhancing system performance by eliminating time spent in disabling resources to excessive spin lock times held by processors.

2. Discussion of the Prior Art

Virtual memory management schemes enable a computer system to present a large address space, larger than the amount of real storage on the system. A virtual memory management scheme consists of a mapping of an address space which provide a means of translating a virtual address of a page into a real address of a frame. A frame is the basic unit by which real storage is managed in a computer system. For example, in IBM's OS/390 system, a frame consists of 4096 bytes.

Since real storage is a limited resource, when the operating system determines that it has become scarce it may try to write the data on some real frames to auxiliary storage, also called a direct access storage device (DASD) which is cheaper and more plentiful, but much slower to access. This operation is known as paging and involves initiating output device I/O to auxiliary storage. The operating system makes paging decisions at a global level and a local level. At the global level, the operating system determines which address spaces will suffer a potential performance penalty of having their data paged out to auxiliary storage. At the local level, the operating system determines which frames within an address space are good candidates to be paged to auxiliary storage. In general, frames which are least recently used are better candidates to be paged to auxiliary storage since they have a lower likelihood of being referenced in the near future. Computer systems, including IBM's OS/390, provide facilities to approximate least recently used (LRU) order. Part of the facility is the Referenced bit which is associated with each frame of storage in z/Architecture. The Referenced bit is turned on by the hardware whenever a frame of storage is referenced or changed. A separate bit called the Changed bit is turned on by the hardware whenever a frame is changed. OS/390 also provides an instruction called Reset Reference Bit Extended (herein referred to a RRBE) which sets the Referenced bit to zero and sets a condition code which provides an indication of whether the frame was changed and/or referenced. The OS/390 operating system maintains a data structure, known as the Page Frame Table Entry (or PFTE) that includes data corresponding to a single frame. The aggregate of PFTEs is referred to as the PFT or Page Frame Table. PFTEs corresponding to frames used for a particular address space are placed on a queue referred to as a pageable frame queue.

FIG. 1 is a conceptual diagram illustrating the use of a data frame space 10 comprising page frame queues in conventional use today. As shown in FIG. 1, there is provided a data space of memory, typically comprising two (2) Gigabytes worth of memory where data may be stored. If an address space owns any dataspaces, then a Dataspace Anchor Block (DAB) construct 15 is provided that includes or points to information about all the dataspaces owned by the particular address space. It is understood that a particular "address space" may own many dataspaces. For instance, the DAB 15 is shown in FIG. 1 as including pointers for linking a data space Pageable Frame Queue (PFQ) 12 comprising all the frames allocated to all the data spaces owned by an address space. This queue 12 may include a queue of allocated frames to back virtual storage for a dataspace, which frames may be stolen (i.e., capable of being migrated by the operating system) to a slower medium such as auxiliary storage if a real storage shortage exits in the system.

As shown in FIG. 1, for example, pageable frame queue 12 includes PFTEs 14 associated with frames of a first data space and PFTEs 16 associated with frames of a second data space. It is understood that the queue 12 may comprise PFTEs for pageable frames associated with many user dataspaces. As shown, the queue 12 is a double threaded queue anchored in the Dataspace Anchor Block (DAB) 15 with each PFTEs 14,16 of the queue maintaining forward and back pointers for referencing other PFTE in the queue 12. Queue length for user dataspace queues is only bound by the amount of real storage available.

That is, currently, every address space in OS/390 has a virtual address limit of two (2) Gigabytes. Thus, even if the entire address space was backed in real (main processor storage) only 512K PFTE control blocks (2 Gbytes divided by 4Kbytes, as each frame/page is 4 Kbytes) are needed to be queued to any queue that represents the amount of real storage allocated to a particular address space. As mentioned, an address space may own many dataspaces and all the frames (PFTEs) allocated to all of those dataspaces are queued on a long single queue 12. Thus, if an address space owned five (5) dataspaces and each dataspace had 2 Gbytes of virtual storage, then if all 5 dataspaces were backed for 2 Gbytes worth of storage for each dataspace, the dataspace frame queue 12 would be 10 Gbytes/4 k=2.5G long. So the more dataspaces an address space owns, the longer the dataspace frame queue 12 anchored from the DAB 15 would be. In the OS/390 architecture, the maximum real (main processor) storage is 2 Gbytes. So for the given example, all five 5 dataspaces could never be backed in real storage at the same time. However, with newer 64-bit architectures (e.g., z/Architecture), the maximum real storage for an OS/390 system is 64 Gbyte (and it will grow in the future). Therefore, in z/Architecture, the potential is that the dataspace queue will grow without a bound.

Referring back to FIG. 1, periodically, this pageable frame queue 12 is traversed and the RRBE instruction is used to determine whether the frame is referenced. PFTEs corresponding to frames that have been referenced are moved to the back of the queue. This traversal of the PFTE queue is known as Unreferenced Interval Count Update (or UIC Update) in the OS/390 system, for example. UIC update exploits the RRBE (reset reference bit extended instruction) which, besides resetting the reference bit associated with the frame, returns a condition code which indicates whether the frame is referenced and/or changed. In the case where the frame is referenced, the frame's UIC value is set, e.g., to zero, to indicate when the frame was last referenced.

Any such system must periodically process real storage to determine whether the storage has been referenced since the last time it has been processed and if so, make the frame a less desirable steal candidate. Thus, when a UIC update is performed, each PFTE that is in use for a particular address space is processed to determine whether its corresponding frame has been referenced. If the corresponding frame has been referenced, the PFTE is moved to the back of the PFTE queue. Thus, when an address space is selected for stealing, steal candidates are selected by traversing the PFTE queue from the front to the back, in Least Recently Used (LRU) order.

In the IBM OS/390 the LRU algorithm is implemented by keeping an Unreferenced Interval Count for each in-use frame in the system, and by keeping frames on in-use frame queues ordered by descending UIC. Currently, the UIC update task (LRU task) gets a list of address spaces to process and continues to run until all the frame queues for every address space on the list are processed. The UIC update process runs disable with spin locks held for serialization purposes.

If the LRU update task runs a long time, it may cause other processors in the system to exhibit a condition referred to as Excessive Spin Condition (also called a "spin loop"). This condition results when a processor requests a resource such as a lock that is not available because another processor holds the lock. The processor requesting the lock will continue testing in a loop if the lock is available until the other processor releases it. To prevent the requesting processor from looping infinitely on testing the lock (spinning), the system detects a processor that has been spinning excessively and abnormally ends the current unit of work on that processor. Therefore the longer a process (like the LRU process) on a processor is holding lock(s) that can be requested by other processes on other processors, the longer the time that those competing processes are going to spend spinning for the requested lock(s). If the LRU process holds the lock for a really long time then it can cause those other processes to excessively spin for the requested locks and ultimately be terminated by the system in order to avoid spinning infinitely.

The implementation of a LRU page replacement algorithm in software becomes very prohibitive as the physical memory of the machine increases. The overhead of the LRU algorithm is directly related to the number of frames that exist in a system, as the number of frames a system can have grows, the overhead of the LRU algorithm also grows. The primary expense of this algorithm is the time spent to keep frames in Least Recently Used order while running disable with serialization resources held. As the overhead of the LRU algorithm increases, the time that competing tasks spend spinning for serialization resources held by the LRU task also increases causing an excessive spin condition to occur on the processor.

It would thus be highly desirable to provide a way to eliminate excessive spin conditions on systems implementing a LRU algorithm.

SUMMARY OF THE INVENTION

It is an object of the present invention to provide a mechanism for eliminating excessive spin conditions on systems implementing a LRU algorithm.

It is a further object of the present invention to provide shorter page frame (PFTE) queue length for limiting the amount of time a UIC update task may run in any one invocation thereby resulting in frequent released serialization resources and eliminating excessive spin conditions.

It is still another object of the present invention to limit the amount of time a LRU task is allowed to run in any one invocation. If this time limit is exceeded before the LRU task has completed its processing of all required queues, the LRU task will reschedule itself to run after a short time interval, record which frames have been processed so far, release its serialization resources, and exit to open a window of enablement. During this window, other processes that were spinning for the serialization resources can have a chance to run. When the LRU task runs again it will re-obtain the serialization resources and continue processing frames that were not previously processed. The above process will be repeated until all the appropriate frames in the system are in LRU order.

According to the principles of the invention, there is provided for a computing system implementing a virtual memory system having real memory storage frames for storing virtual pages of data and an auxiliary storage system comprising auxiliary storage slots for storing copies of corresponding virtual pages provided in real storage frames, wherein a page frame queue comprising frames is traversed in LRU order to determine real frame candidates for storage in the auxiliary storage system, a system and method for eliminating excessive spin conditions on systems implementing a LRU algorithm, the method comprising: establishing time limit representing an amount of time a LRU task is allowed to run in an invocation; determining whether the time limit has been exceeded before said LRU task has completed its processing; and, if the time limit has been exceeded, terminating the LRU task and, re-scheduling the LRU task to run after a predetermined time interval, whereby during the time interval, other processes spinning for resources may run. As part of the re-scheduling process, the LRU task records which frames have been processed so far, releases its serialization resources, and terminates running to thereby open a window of enablement. During this window, other processes that were spinning for the serialization resources have a chance to run. When the LRU task runs again it will re-obtain the serialization resources and continue processing frames that were not previously processed. The above process will be repeated until all the appropriate frames in the system are in LRU order.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

As mentioned, the present invention is directed to an operating system mechanism for diminishing the possibility that an excessive spin condition would occur on a processor during LRU processing due to increased real storage that is available to the system.

Figure 1:
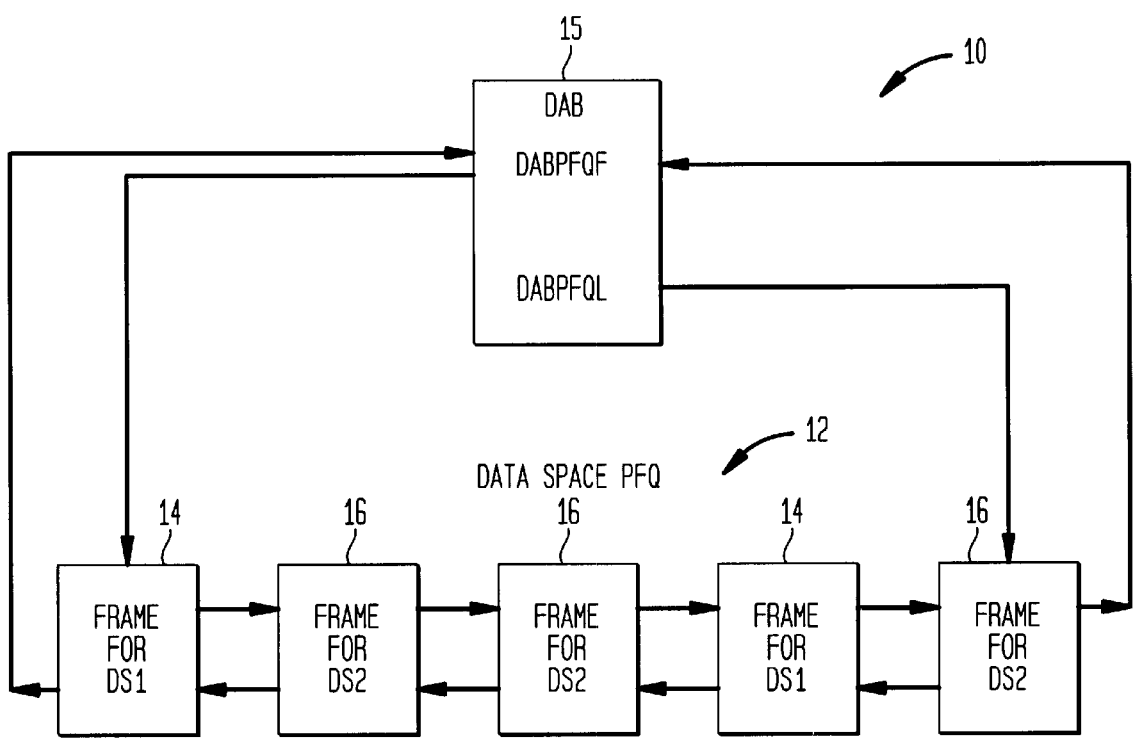
FIG. 1 is a conceptual diagram illustrating the use of a data frame space 10 comprising page frame queues 12 in conventional use today.
Figure 2:
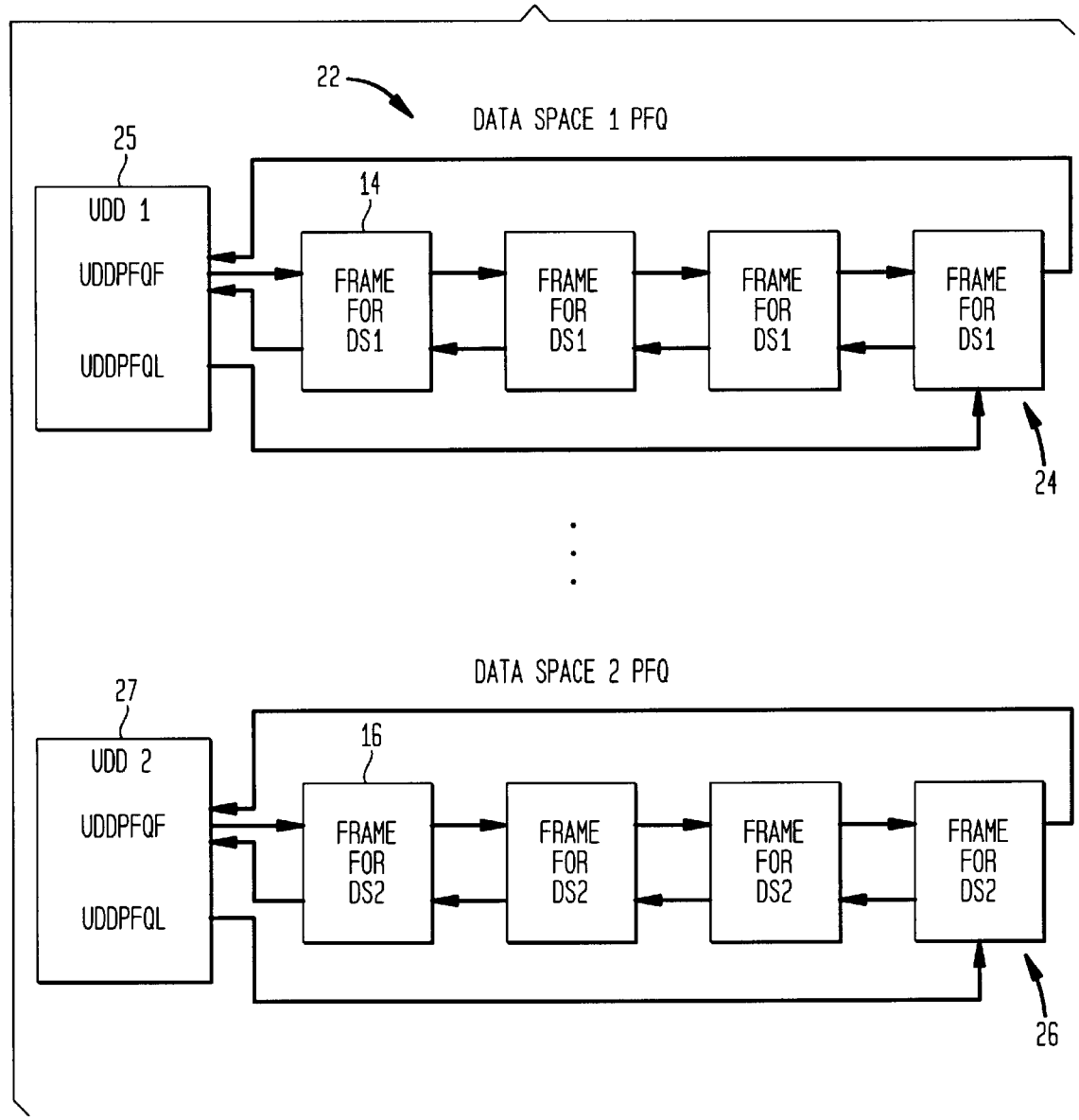
FIG. 2 particularly illustrates how the data space PFQ 22 of FIG. 1 is now configured as two smaller in-use frame queues according to the invention.

According to the invention, the UIC update task (LRU task) is modified to limit the amount of time the UIC update task can run in any one invocation. This time limit is checked after all the frames on a particular queue have been processed. In order to ensure that there is enough time to process all the frames on a particular queue without causing an excessive spin condition, the length of each in-use frame queue is limited to about 512K elements (2 Gigabytes worth of Frames). Thus, according to the invention, as depicted in FIG. 2, the Real Storage Manager (RSM) system is configured to create one or more limited length "in-use" frame queues, e.g., queues 24, 26, with each queue associated with a separate user data space. Preferably, each of these "in-use" queues are limited to a length of approximately two (2) Gigabytes worth of data, which corresponds to a queue length of about 512K PFTE elements, for example. FIG. 2 particularly illustrates how the data space PFQ 22 of FIG. 1 is now configured as two smaller in-use frame queues 24, 26 with in-use queue 24 comprising a double thread of linked frames 14 associated with a first dataspace for the example shown in FIG. 1 and shown anchored from an associated User Dataspace Descriptor block (UDD) and in-use queue 26 comprising a double thread of linked frames 16 associated with a second dataspace and separately anchored from its associated UDD 27. Preferably, each UDD 25, 27 comprises information pertaining to a particular data space owned by an address space. Thus, according to the invention, a dataspace pageable/fixed queue 24, 26 associated with a respective dataspace is anchored from each respective UDD 25, 27, with each new queue 24, 26 representing frames allocated to a particular dataspace and limited in length, e.g., 512K elements. The implementation of limited length queues according to the invention open windows of enablement at a much greater frequency, thus eliminating excessive spin conditions as will be described in greater detail herein.

Thus, a given queue will be processed as a unit by the UIC update task but separate queues may be processed on separate invocations. As each queue is processed, a record is kept to indicate the fact that that queue has been processed. If, after processing a particular queue, it is found that an allowable time limit has been exceeded and that not all frame queues have been processed, the UIC task reschedules itself to run after a short time interval, releases its serialization resources, and exits to open a window of enablement. This process repeats until UIC update has processed all the frame queues belonging to all address spaces on the list. The fact that a window of enablement is opened periodically during the UIC update process permits other tasks spinning for the same serialization resources a chance to run, thus avoiding excessive spin conditions.

The Real Storage Manager (RSM) and the System Resources Manager (SRM) work together to perform UIC update. Namely SRM schedules the RSM process that does UIC update. In order to effect the changes to the UIC update feature for the IBM OS/390 as described herein, the interface between the System Resources Manager (SRM) and the Real Storage Manager (RSM) is modified.

Figure 3:
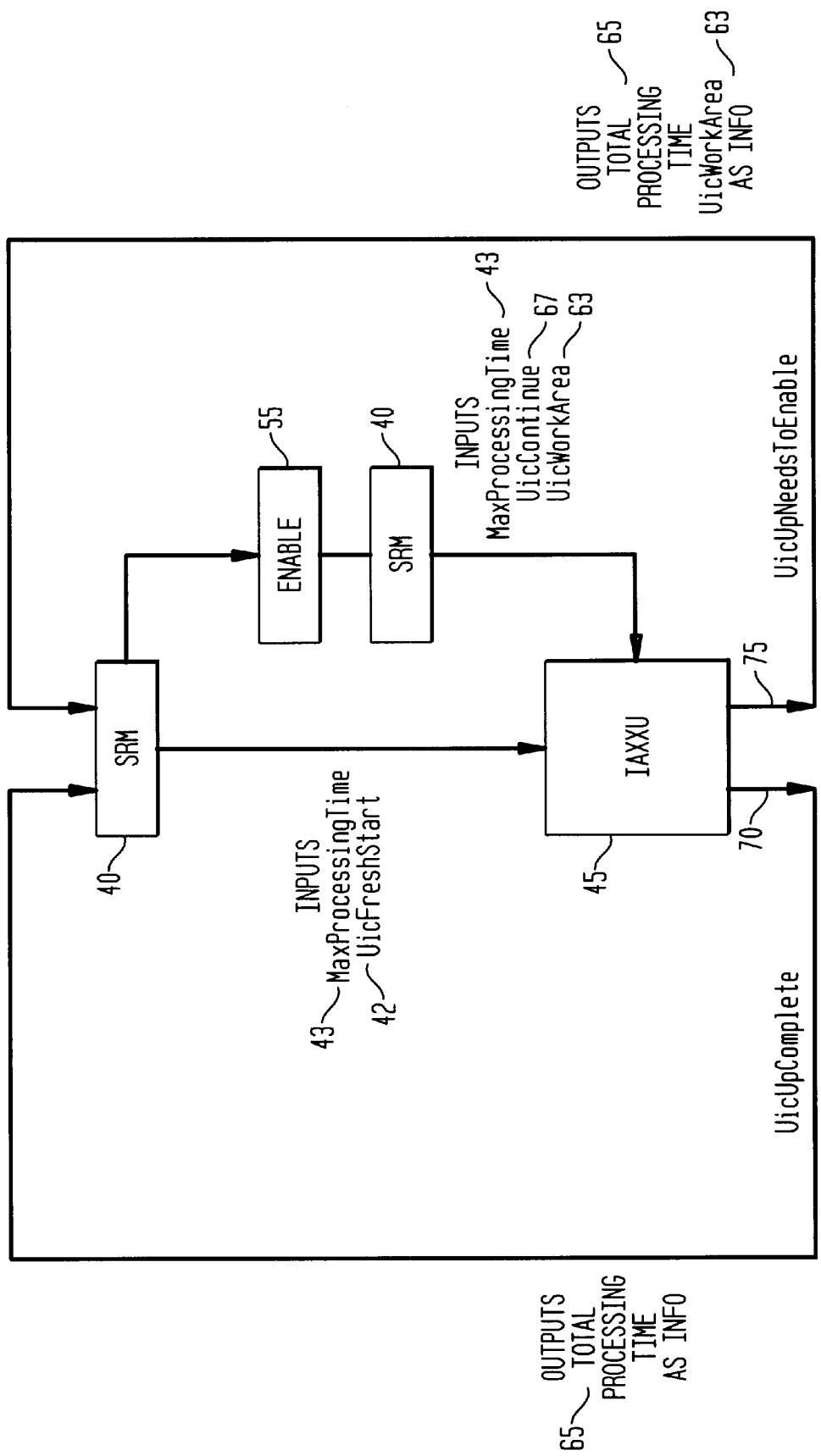
FIG. 3 illustrates an example implementation of the interface between SRM and RSM components so that spin loops would be avoided during UIC update according to the invention.

FIG. 3 illustrates an example implementation of the interface between SRM and RSM components structured so that spin loops would be avoided during UIC update according to the invention. Particularly, as shown in FIG. 3, SRM will provide the RSM with a parameter list: 1) a list of address spaces to process; and 2) an indication if this is a new UIC update request or a continuation request; and further instruct how much time should be spent in UIC processing for this call before it should enable so as not to cause a spin loop situation. When SRM calls RSM to do UIC processing for a list of address spaces, RSM will ensure that the amount of time spent in UIC processing is not greater than the time specified by SRM. RSM will accomplish this by making a time check after each of the frame queues for an address space is processed. If there is not enough time to process all the address spaces that SRM specified on this call to UIC update, RSM will return to SRM via the parameter list an indication of which address spaces were processed by UIC update during this call, and a return code indicating that RSM should be called again to finish the original UIC update request. SRM will release any spin locks that were held, enable, re-obtain the spin locks, and call RSM again to finish UIC update for the rest of the address spaces that were not processed the first time around. RSM knows which address space and which queue within an address space to start processing on a continuation call by information that it keeps in a RSM work area in the parameter list. A given queue will be processed as a unit by UIC update but separate queues for the same address space may be processed on separate invocations. RSM will indicate that an address space has been processed if all the frames queues for that particular address space had their UIC updated. This process will continue until UIC update has taken place for all address spaces on the list.

More specifically, as shown in FIG. 3, SRM 40 calls RSM UIC update processing (IAXXU) 45 with a parameter list which serves as the communication vehicle between the SRM and RSM components and includes a list of address spaces. RSM processes all address spaces in the list and all queues related to each address space. UIC processing takes place disabled while holding spin locks. A Maxuic variable is reported back for each address space in the list and bucket counts for each address are updated. The amount of time UIC update may run during one invocation is limited. The amount of time UIC update may run is provided by SRM in the parmlist to IAXXU 45 and this time limit is checked after each frame queue is processed. If the time limit is exceeded before UIC update processing is complete, RSM returns a code 50 to SRM 40 that initiates SRM 40 to open a window of enablement 55. RSM returns a code indicating to SRM that RSM needs to be called again after enablement in order to complete UIC update processing. The above process is repeated until UIC update is complete. It is understood that a given queue must be processed as a unit by UIC update, but separate queues may be processed in separate invocations. That is, according to the preferred embodiment, RSM will move to a structure with separate frame queues for each dataspace owned by an address space anchored from the UDD that represents a particular dataspace. This will limit the queue length of each dataspace pageable frame queue to 512K elements (PFTEs) since each dataspaces may represent up to 2 Gbytes of virtual data, for example.

Particularly, when SRM 40 calls RSM 45 SRM will initialize the parameter list to RSM. The function code will either be 'UicFreshStart' 42 for indicating whether the current call is a brand new call to UIC update or, a continuation call. SRM will also indicate in the parameter list the maximum amount of time that RSM should spend in the UIC update process. This is specified via the Max Processing Time function code 43. When RSM gets control with a 'UicFreshStart' function code, it will clear/initialize the necessary flags to indicate that no address spaces have been processed so far, and no queues for any address space have been processed. RSM will then run the UIC update process until either all frames owned by each address space specified in the parameter list and all its dataspaces have been updated, or the maximum time limit specified in the parameter list for this call to UIC update has been reached. If RSM has updated all the frames, it will set the 'UICUpComplete' return code 70 indicating that this UIC Update invocation has completed.

If RSM hits the maximum time limit before updating all frames, it will set indicators in the parameter list indicating which address space was currently being processed and which queues owned by that address space have been processed so far, so it knows where to restart. This will be done in the UicWorkArea 63 portion of the parameter list. It is important to keep track of which address spaces, and which queues for a particular address space were processed on a previous call so that each queue for a particular address space is processed once and only once during a UIC update. RSM in this case will set the 'UICUpNeedsToEnable' return code 75 to indicate to SRM that this UIC Update call processing was not completed and should be called again after enablement. If SRM gets a 'UICUpComplete' return code 70 from RSM it will process the UIC counts for all the address spaces. In either event, the output of the RSM UIC update process includes a TotalProcessingTime value 65 which represents the actual processing time spent during that call to UIC Update. If SRM gets the 'UICUpNeedsToEnable' return code from RSM it will save the 'UicWorkArea' and reschedule itself to open an enabled window. When SRM's UIC update code gets control again, it will call RSM with a function code 67 indicating that is a continuation call ('UICContinue') of a previous invocation. It will also set the maximum amount of time 43 that RSM should spend in the UIC update process and it will pass the 'UicWorkArea' back to RSM, so RSM knows where to continue processing from (which queue in which address space). RSM will now start from the same space it was on previously based in the information in the UicWorkArea. This above process will be repeated until all queues for all address spaces have had their UIC updated.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. In a computing system implementing a virtual memory system having real memory storage frames for storing virtual pages of data and an auxiliary storage system comprising auxiliary storage slots for storing copies of corresponding virtual pages provided in real storage frames, wherein a page frame table queue comprising frames is traversed in Least Recently Used (LRU) order to determine real frame candidates for storage in said auxiliary storage system, a method for eliminating excessive spin conditions on systems implementing an LRU order queue traversal algorithm, said method comprising:
   a) establishing time limit representing an amount of time a LRU task is allowed to run in a queue traversal invocation, wherein processor spin locks are held for serialization purposes during said LRU task invocation;
   b) determining whether said time limit has been exceeded before said LRU task has completed its processing; and, if the time limit has been exceeded,
   c) terminating the LRU task and, re-scheduling the LRU task to run after a predetermined time interval, whereby during said time interval, opening up a window of enablement so other processes spinning for the serialization resources can run.

2. The method for eliminating excessive spin conditions as claimed in claim 1, wherein said terminating step c) comprises the steps of:
   d) recording which address spaces have been processed and which page frame table queues within a particular address space have been processed during said time limit;
   e) releasing its serialization resources; and,
   f) terminating the LRU task for said pre-determined time interval.

3. The method for eliminating excessive spin conditions as claimed in claim 2, wherein after said pre-determined time-interval, commencing invocation of said LRU task by
   g) re-obtaining said serialization resources; and,
   h) processing frames that were not previously processed during a prior invocation.

4. The method for eliminating excessive spin conditions as claimed in claim 3, further comprising repeating steps a)–g) until all the appropriate frames in the system are in LRU order.

5. The method for eliminating excessive spin conditions as claimed in claim 4, further comprising the step of limiting a length of a page frame table queue when determining said real frame candidates.

6. The method for eliminating excessive spin conditions as claimed in claim 5, further comprising a step of providing a System Resource Manager SRM for specifying said time limit to said LRU task.

7. The method for eliminating excessive spin conditions as claimed in claim 4, further comprising the step of: temporarily storing a next frame queue to be processed in a subsequent LRU task iteration after said pre-determined time interval.

8. In a computing system implementing a virtual memory system having real memory storage frames for storing virtual pages of data and an auxiliary storage system comprising auxiliary storage slots for storing copies of corresponding virtual pages provided in real storage frames, wherein a page frame table queue comprising frames is traversed in Least Recently Used (LRU) order to determine real frame candidates for storage in said auxiliary storage system, a system for eliminating excessive spin conditions on systems implementing an LRU order queue traversal algorithm, said system comprising the steps of:
   a system resource manager for establishing time limit representing an amount of time a LRU task is allowed to run in a queue traversal invocation, wherein processor spin locks are held for serialization purposes during said LRU task invocation;
   real storage manager for determining whether said time limit has been exceeded before said LRU task has completed its processing; and, if the time limit has been exceeded, terminating the LRU task and, re-scheduling the LRU task to run after a pre-determined time interval, whereby during said time interval, other processes spinning for the serialization resources can run.

9. The system for eliminating excessive spin conditions as claimed in claim 8, wherein said real storage manager includes mechanism for recording which address spaces have been processed and which page frame table queues within a particular address space have been processed during said time limit, and releasing its serialization resources prior to terminating the LRU task.

10. The system for eliminating excessive spin conditions as claimed in claim 9, wherein after said pre-determined time-interval, said system resource manager iteratively invokes said LRU task, wherein serialization resources are released prior to terminating the LRU task by re-obtaining said serialization resources after said pre-determined time interval for each iteration.

11. The system for eliminating excessive spin conditions as claimed in claim 10, a page frame table queue processed by said LRU task is limited in length.

12. The system for eliminating excessive spin conditions as claimed in claim 10, further comprising device for storing a next frame queue to be processed in each subsequent LRU task iteration after said pre-determined time interval.

* * * * *